W. J. RAND.
PREPARATION OF DESICCATED VEGETABLE EXTRACTS.
No. 48,719. Patented July 11, 1865.
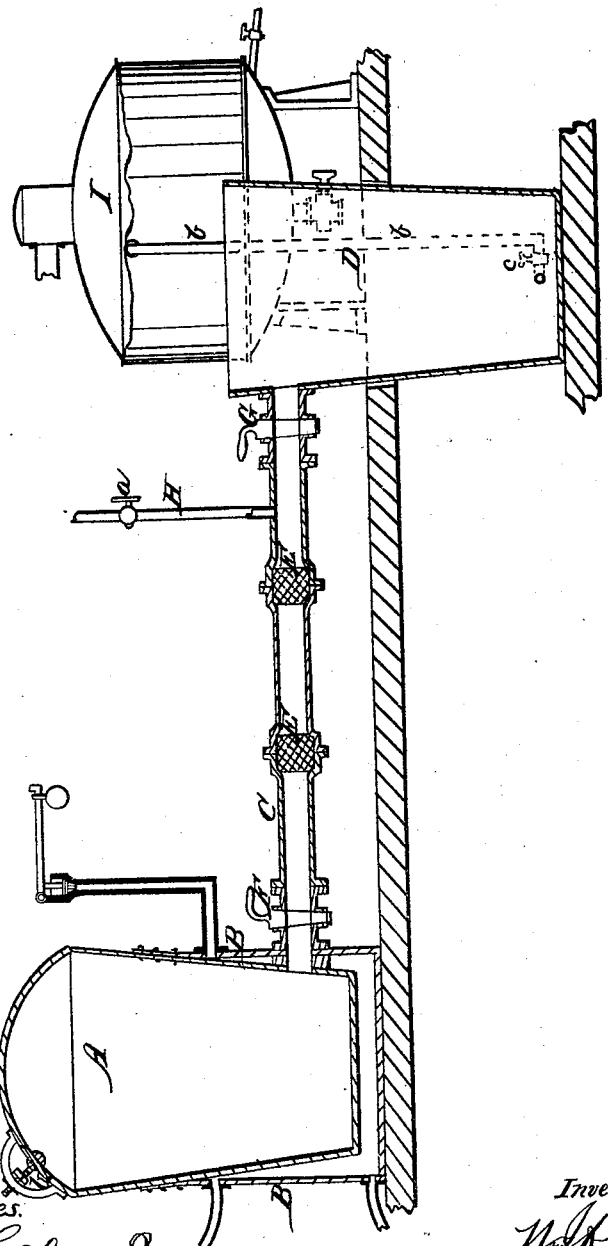
Witnesses.
Inventor.

UNITED STATES PATENT OFFICE.

WM. J. RAND, OF BROOKLYN, NEW YORK.

IMPROVEMENT IN THE PREPARATION OF DESICCATED VEGETABLE EXTRACTS.

Specification forming part of Letters Patent No. 48,719, dated July 11, 1865.

*To all whom it may concern:*

Be it known that I, WILLIAM J. RAND, of the Eastern District of the city of Brooklyn, in the county of Kings and State of New York, have invented a new and useful Improvement in the Preparation of Desiccated Animal and Vegetable Extracts; and I do hereby declare that the following is a full, clear, and exact description of the same, reference being had to the accompanying drawing, which represents a vertical section of the apparatus employed in carrying out my invention.

This invention relates to the preparation or manufacture of desiccated juices and soluble extracts of animal and vegetable substances free from skin and fiber.

The ordinary method of preparing such desiccated juices and extracts is, first, to extract the juices or soluble or reducible products by boiling the animal or vegetable substances in an open vessel, next to strain them from the skin and fiber, and in the case of animal substances to skim off or separate the fat, and finally to concentrate or evaporate to a suitable density *in vacuo* and dry them. By boiling in an open vessel the juices and soluble or reducible matters are in many cases, especially in the case of animal substances, imperfectly extracted or obtained, and in all cases the process of extraction is comparatively slow.

With a view to effect this extraction more perfectly and rapidly, and to obtain in a highly concentrated or desiccated form the whole of the soluble matter contained in animal and vegetable substances, my improvement consists in first boiling the substances in a close digester under a greater than atmospheric pressure, preparatory to the separation of the skin, fiber, and other matters which are insoluble in water and the concentration and desiccation of the soluble matters.

My improvement further consist in straining the juice or soluble extract from the skin, fibrous, or other insoluble portions of the meat or other substances from which the juice or extract is obtained by forcing it from the digester through a strainer or strainers by means of the pressure of the steam in the digester, by which means the straining is much more rapidly effected than if performed by the force of gravitation, and any portions of the substance which are not, strictly speaking, soluble, but are reduced to a pulpy state in the digester, are pressed through a strainer of sufficient fineness to prevent the passage of the finest portions of the unreduced fiber.

To enable others to apply my invention to use, I will proceed to describe it with the aid of the drawing.

A is the digester, surrounded with a heating-jacket, B, which is either supplied with steam from a separate boiler or has steam generated from water contained within it by the heat of a fire below.

C is a pipe leading from the lower part of the digester to a suitable receiving-vessel, D, into which the juices and soluble or reduced matters are drawn off from the digester through the said pipe when the contents of the digester have been sufficiently digested. This pipe is fitted with one or more strainers, E E, of wire-gauze, cloth, or other suitable material, and with two cocks or stop-valves, F G, one between the strainers and digester and the other between the strainers and the receiving-vessel D.

H is a steam-pipe leading from a boiler or from the jacket B to the pipe C, which it enters between the stop-cock or valve G and the nearest strainer. This pipe is furnished with a stop-cock, *a*, to admit steam into the said pipe from time to time at a pressure greater than that in the digester, for the purpose of blowing back from the strainers any fiber or other insoluble or irreducible matter that may accumulate against their back sides and tend to choke the passage through them.

I is a vacuum-pan for the concentration of the juice or extract connected with the receiver D by a pipe, *b*, in which there is a stop-cock, *c*.

The operation of preparing animal juices and extracts in this application is as follows: The meat may or may not have cut from it any of the large masses of fat before being introduced; but as the bones contain much nutritive matter, I prefer to put them, with the meat, into the digester through the man-hole *b*, the cock or valve F being closed. A suitable quantity of water is introduced along with the meat, and when the digester is full enough the man-lid is put on and secured, and the digester heated to a temperature of about 300° Fahrenheit. After the digester has proceeded for a proper time—say about four hours—the cocks F and G are opened and the pressure of the steam in the digester forces out all the fluid and dissolved matter through the strainers E E into the receiver D, the skin, fiber, and other insoluble or irreducible matter being held back by the strainers. By using very fine strainers with diaphragms of cloth or felt I can so strain the product of digestion as to obtain a clear solution of the meat-juice, like beef-tea; or by using diaphragms in the strainers I can allow such portions of the meat as are reduced to a pulpy state by the process of digestion to pass the strainers, holding back only the skin, irreducible fiber, and other solid matters. As often as it is necessary to clear the strainers I close the cock or stop-valve G and open the cock a to admit steam to the pipe C to force or blow back the accumulated fiber and solid matter from the strainers. When the strained product has been all drawn into the receiver D a vacuum is produced in the vacuum-pan I, and the stop-cock c is opened and said product forced from the receiver into the vacuum-pan by atmospheric pressure, taking care (if it has not been previously skimmed) that the stop-cock c is closed before the grease, which floats on the top of the other products, has reached it. When the product has been sufficiently concentrated it is removed from the vacuum-pan and desiccated in any known or suitable manner.

In the preparation of the juices and extracts of fruits, berries, and other vegetable substances, the fruits, berries, or other substances have the stalks removed, and when desirable the pits or seeds also, and are put into the digester either with or without water, and after having been subjected to the digesting process for a proper length of time, which will be determined by experience, are run through the strainers into the receiver D, and afterward concentrated and desiccated in the same manner as the animal juices or extracts. In operating upon vegetable matters the strainers may be adapted to allow only the juice or the juice and pulpy matter to pass through them.

Among the vegetable substances besides fruits and berries which may have their juices or other soluble products extracted, concentrated, and desiccated by my process may be mentioned malt and hops, the desiccated soluble extracts of which may be kept for any length of time, to be used whenever required for making ale.

I do not claim separately either the extraction of the juices or soluble portions of animal or vegetable substances by digestion under a pressure greater than that of the atmosphere or the concentration of the juices or soluble extracts of animal or vegetable substances in vacuo; but

I claim as my invention and desire to secure by Letters Patent—

1. As an improvement in the process of obtaining desiccated or highly-concentrated juices or soluble extracts of animal or vegetable substances, first obtaining the juices or soluble extracts of such substances by heating or boiling them under a pressure greater than that of the atmosphere, and afterward straining and concentrating the juices or extracts so obtained by evaporation *in vacuo*, substantially as herein described, whereby I am enabled to obtain in the concentrated or desiccated product all the soluble or reducible matters contained in the said substances.

2. Forcing the juices, extracts, or reducible substances obtained by the digestion of animal substances through strainers by means of the pressure of steam in the digester, substantially as herein specified.

3. The steam-pipe H and its cock a and the stop valve or cock G, applied in relation to each other and to the digester and receiver, and in combination with the pipe C, substantially as and for the purpose herein specified.

4. The combination of the digester A, pipe C, one or more strainers, E, receiver D, and vacuum-pan I, the whole arranged and operating substantially as and for the purpose herein specified.

WM. J. RAND.

Witnesses:
GEO. W. REED,
L. HOLMS, Jr.